(12) United States Patent
Abbondanzio et al.

(10) Patent No.: US 11,329,864 B2
(45) Date of Patent: May 10, 2022

(54) REMOTE COMPUTING SYSTEM EVENT RESOLUTION (71) Applicant: Lenovo Enterprise Solutions (Singapore) PTE. LTD., New Tech Park (SG)

(72) Inventors: Antonio Abbondanzio, Raleigh, NC (US); Matthew Robert Alcorn, Durham, NC (US); Nicholas J. Balogh, Raleigh, NC (US); James Gordon McLean, Raleigh, NC (US); Randall William Worzella, Raleigh, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 1137 days.

(21) Appl. No.: 15/406,177

(22) Filed: Jan. 13, 2017

(65) Prior Publication Data
US 2018/0205595 A1 Jul. 19, 2018

(51) Int. Cl.
*H04L 41/0654* (2022.01)
*H04L 41/0816* (2022.01)
*H04L 41/22* (2022.01)

(52) U.S. Cl.
CPC ...... *H04L 41/0654* (2013.01); *H04L 41/0816* (2013.01); *H04L 41/22* (2013.01)

(58) Field of Classification Search
CPC .................................. H04L 41/0654
See application file for complete search history.

(56) References Cited

U.S. PATENT DOCUMENTS

| | | | | |
|---|---|---|---|---|
| 10,320,813 | B1* | 6/2019 | Ahmed | H04L 63/1441 |
| 2008/0027566 | A1* | 1/2008 | Baek | H04L 12/2818 700/3 |
| 2009/0249130 | A1* | 10/2009 | Shimada | G06Q 10/10 714/48 |
| 2012/0016948 | A1* | 1/2012 | Sinha | G06Q 10/10 709/207 |
| 2015/0271008 | A1* | 9/2015 | Jain | H04L 41/0672 714/57 |
| 2018/0131574 | A1* | 5/2018 | Jacobs | G06F 8/65 |
| 2018/0131695 | A1* | 5/2018 | Saville | H04L 47/2441 |

\* cited by examiner

*Primary Examiner* — Jeffrey R Swearingen
(74) *Attorney, Agent, or Firm* — Kunzler Bean & Adamson; Bruce R. Needham (57) ABSTRACT A computing device receives a notification from a remote computing system that an event has occurred, and determines an action to resolve the event. The device may present the action via a user interface element, and responsive to user actuation of the element, perform the action. The device may instead automatically perform the action without first obtaining user approval, and then present the action and a user interface element to roll back performance of the action; responsive to user actuation of the element, the device performs an undo action. The device may alternatively present the action and a user interface element to disapprove performance of the action. If a user does not actuate the element within a length of time, the device automatically performs the action without first obtaining user approval; if the user actuates the element, the device does not perform the action.

23 Claims, 8 Drawing Sheets

REMOTE COMPUTING SYSTEM EVENT RESOLUTION

BACKGROUND

Entities like companies, governments, and other organizations commonly maintain large numbers of computing systems for a variety of different purposes. Such computing systems may be disposed in central locations, and managed remotely. That is, administrators responsible for managing the computing systems may not physically travel to the locations where the computing systems are disposed, but rather may remotely log into the computing systems. The administrators may interact with such remote computing systems via web interfaces, command line interfaces (CLIs), or specialized application programs, including mobile computing device apps that may run on smartphones of the administrators.

SUMMARY

An example method includes receiving, by a computing device from a remote computing system over a network, a notification that an event has occurred at the remote computing system. The method includes determining, by the computing device, an action to resolve the event at the remote computing system. The method includes presenting, by the computing device, the action to a user of the computing device, including a user interface element actuatable by the user to select the action. The method includes, responsive to detecting actuation of the user interface element by the user, performing, by the computing device, the action on the remote computing system over the network to resolve the event at the remote computing system.

An example computer-readable data storage medium is not a transitory signal and stores computer-executable code. A computing device executes the code to receive, from a remote computing system over a network, a notification that an event has occurred at the remote computing system. The computing device executes the code to determine an action to resolve the event at the remote computing system. The computing device executes the code to automatically perform the action on the remote computing system over the network to resolve the event at the remote computing system without first obtaining approval from the user. The computing device executes the code to present the action to the user of the computing device, including a user interface element actuatable by the user to roll back performance of the action. The computing device executes the code to, responsive to detecting actuation of the user interface element, perform, by the computing device, an undo action on the remote computing system over the network to roll back the performance of the action.

An example computing device includes network hardware to communicatively connect to a network to which a remote computing system is communicatively connected. The computing device includes display hardware, input hardware, a processor, and a memory storing computer-executable code executable by the processor. The code is executable by the processor to receive from the remote computing system a notification that an event has occurred at the remote computing system. The code is executable by the processor to determine an action to resolve the event at the remote computing system. The code is executable by the processor to present the action to a user of the computing device via the display hardware, including a user interface element actuatable by the user to disapprove performance of the action. The code is executable by the processor to responsive to failing to detect actuation of the user interface element within a length of time after presenting the action to the user, automatically perform the action on the remote computing system over the network to resolve the event at the remote computing system without first obtaining approval from the user. The code is executable by the processor to responsive to detecting actuation of the user interface element via the input hardware within the length of time after presenting the action to the user, remove presentation of the action via the display hardware, including the user interface element, and not performing the action on the remote computing system.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background, computing systems of entities like companies, governments, and other organizations may be remotely managed by administrators. Problems can and do arise at such remote systems, which require actions to be performed to resolve them. For example, hardware of a remote computing system may begin to fail, which may require the migration of software deployed at the computing system, such as virtual machines (VMs) to a different computing system. As another example, a computing system may become overburdened by processing tasks, resulting in quality-of-service (QoS) targets for those tasks not being satisfied. This may require additional computing hardware, in the form of a new computing system potentially, to be deployed so that the processing tasks can be at least partially offloaded from the overburdened system.

In general, therefore, events can occur at remote computing systems that may require actions to be performed on the remote computing systems to resolve them. Such events can be indicative of problems or other issues that have occurred at the remote systems. Traditionally, events have been handled by alerts, or autonomously, which are two discrete paradigms for event handling and resolution. In the former paradigm, when an event occurs at a remote computing system, an alert is sent to an administrator of the remote system. The administrator than has to manually react to the alert to resolve the underlying event. For example, an administrator may receive a text message, email, or other type of alert notifying the administrator that a particular event has occurred at a specific remote computing system. The administrator then has to determine him or herself a course of action to resolve the event, and manually log onto the remote system to cause the action to be performed on the system.

Even if there is an existing policy in effect for resolving the event, the administrator may still have to look up the policy to identify the action that is to be performed. In any case, the administrator has to proceed out-of-band from the communication modality by which the alert was received to perform an action to resolve the event. That is, the administrator receives the alert via a text message or email, but cannot employ a text message or email to perform the action on the remote computing system. Even if the alert is received via a notification on a mobile computing device app for managing the remote computing system, the administrator still has to manually interact with the app to select an action to be performed, and then to cause performance of the action on the remote computing system.

In the autonomous paradigm, when an event occurs at a remote computing system, a predetermined action is automatically performed. At most, subsequent notification that the action has been performed may occur. This may take the form of an email, a text message, or potentially just the addition of a line to an ongoing log for the remote system. The administrator may not realize until a much later point in time, if at all, that the action has been automatically performed. If the action itself has unintended consequences on the remote computing system or another system, the administrator may therefore not realize the impact of the action nor recognize that the action is what caused the problem until much later.

Even if the administrator receives a real-time notification of the event that the remote computing system automatically performed to resolve the event, if the administrator wants to roll back the action by performing a corresponding undo action, he or she still has to proceed out-of-band from the communication modality by which the notification was received. For example, if the administrator receives the notification via a text message or email, the administrator cannot employ a text message or email to roll back the action at the remote computing system. Even if the notification is received via a notification on a mobile computing device app for managing the remote computing system, the administrator still has to manually interact with the app to perform an undo action to roll back the action that the remote system automatically performed.

Techniques disclosed herein resolve these shortcomings related to remote computing system management. When a computing device, like the mobile computing device of an administrator, receives a notification that an event has occurred at a remote computing system, the computing device heuristically determines an action to resolve the event. In one technique, the action is presented to the administrator, including a user interface element that the administrator can actuate to select the action. In response to the administrator actuating the user interface element, the computing device performs the action on the remote computing system to resolve the event. In this implementation, the computing device thus seeks "permission" from the administrator to perform the event resolution action.

In another technique, the computing device automatically performs the action on the remote computing system without first obtaining approval from the administrator. The computing device presents the action to the administrator, including a user interface element that the administrator can actuate to roll back performance of the action. In response to the administrator actuating the user interface element, the computing device performs an undo action on the remote computing system to roll back the performance of the action. In this implementation, the computing device thus seeks "forgiveness" from the administrator after performing the event resolution action.

In a third technique, the computing device presents the action to the administrator, including a user interface element that the administrator can actuate to disapprove of performance of the action. If the administrator does not actuate the user interface element within a length of time after the action has been presented, then the computing device automatically performs the action on the remote computing system to resolve the event. However, if the administrator does actuate the user interface element within the length of time in question, then the computing device does not perform the action. In this implementation, the computing device thus seeks "partial permission" from the administrator.

These techniques can be combined, such that the computing device may transition among "permission," "forgiveness," and "partial permission" or modalities depending on the administrator's responses to recurrences of an event. For example, the default modality may be to ask for approval before performing an action to resolve an event, in accordance with the "permission" modality. If the administrator approves performance of the action, the next time the event occurs, the computing device may indicate that the same action will be performed to resolve the event, if the administrator does not disapprove within a given length of time, in accordance with the "partial permission" modality. If the administrator again approves performance of the action, when the event occurs again, the computing device may automatically perform the action, and ask the administrator whether the action should be rolled back, in accordance with the "forgiveness" modality.

Figure 1:
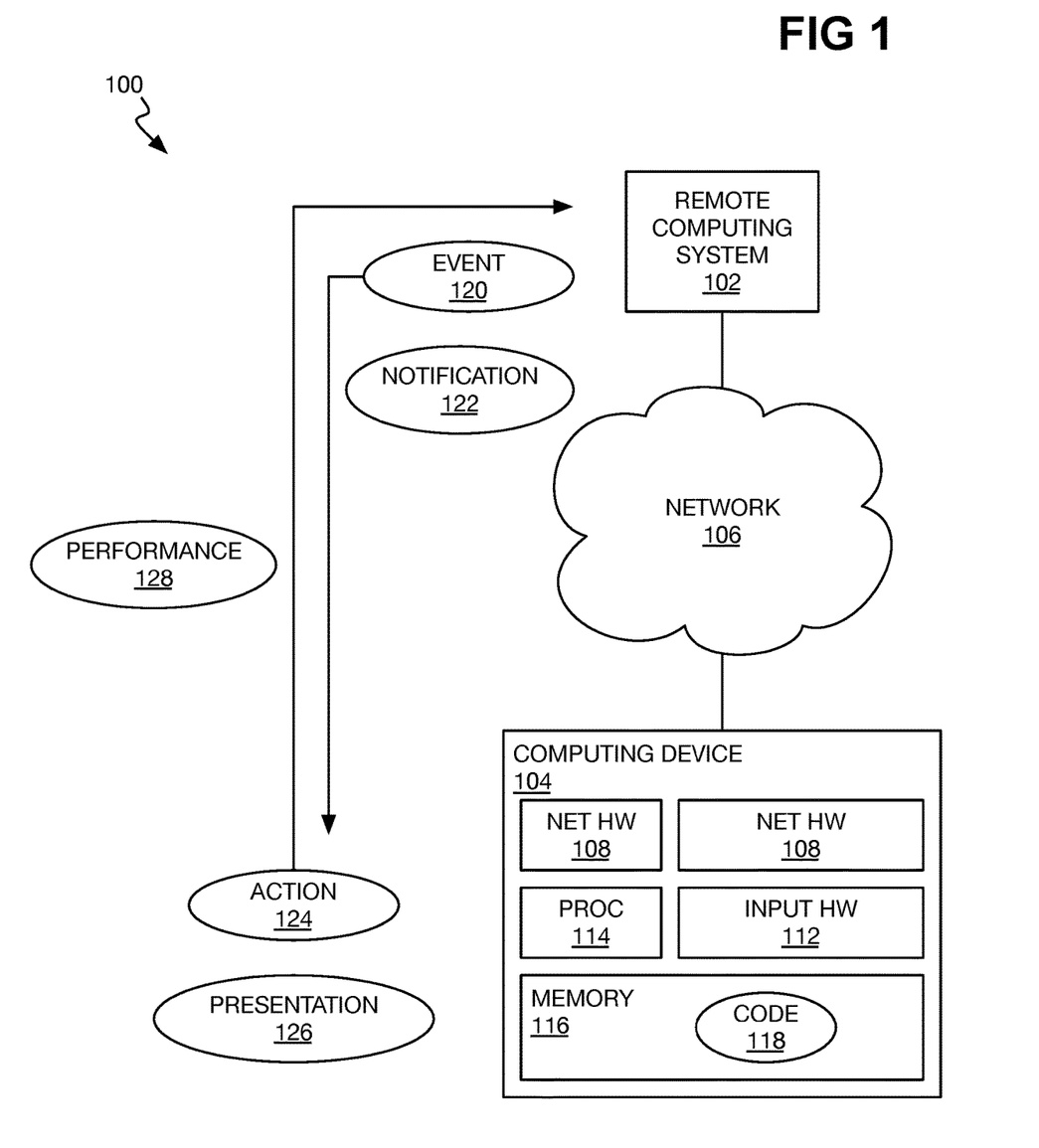
FIG. 1 is a diagram of an example system including a remote computing system and a computing device that receives a notification from the remote system that an event has occurred at the remote system and that determines and performs an action to resolve the event at the remote system.

FIG. 1 shows an example system 100. The system includes a remote computing system 102 and a computing device 104 that are communicatively interconnected to one another by a network 106. The remote computing system 102 is remote in that it can be located at a location different than the location of the computing device 104. Stated another way, the computing system 102 is remote to the computing device 104.

The remote computing system 102 is generally a computing system that is to perform processing tasks assigned to the system 102. The remote computing system 102 may be a database computing system that stores data, and which responds to requests to retrieve data and to store or update date. The remote computing system 102 may be a web server computing system that hosts web pages and web sites accessible over the Internet. The remote computing system 102 may host a number of VMs that are accessible by corresponding client computing devices to perform processing tasks on behalf of the client devices. The remote computing system 102 may be another type of computing system as well. The remote computing system 102 may be a discrete computing device, such as a discrete server, or may be a collection of a number of computing devices, such as a number of servers.

The computing device 104 is a computing device of an administrator. The administrator is responsible for managing the remote computing system 102 to ensure that the remote computing system 102 is properly functioning, including on a hardware level, a software level, and a capacity level. At the hardware level, a remote computing system 102 is properly functioning when none of its constituent hardware is failing or has failed, and when the hardware has been properly configured. Similarly, at the software level, a remote computing system 102 is properly functioning when the software running on its hardware is operating properly and has been properly configured. At the capacity level, a remote computing system 102 is properly functioning when the processing tasks assigned to the remote system 102 are being processed by the system 102 in satisfaction of QoS targets associated with the tasks.

The computing device 104 can be a mobile computing device, such as a smartphone. The computing device 104 can be another type of computing device as well. For example, the computing device 104 may be a desktop or laptop computer. The computing device 104 includes at least network hardware 108, display hardware 110, input hardware 112, a processor 114, and a memory 116. The network hardware 108 may be a wired network adapter or a wireless network adapter that permits the computing device 104 to communicatively connect to the network 106, and thus to communicate with the remote computing system 102. As such, the network 106 can be or include the Internet, intranets, extranets, local-area networks (LANs), wide-area networks (WANs), telephony networks, and cellular or mobile data networks, including 2G, 3G, 4G, and 5G networks, among other types of networks.

The display hardware 110 permits the computing device 104 to display information to the administrator, such as a graphical user interface (GUI). The display hardware 110 may be a flat-panel display. The input hardware 112 permits the computing device 104 to receive user input from the administrator. The input hardware 112 can be or include a touchscreen, discrete buttons, a keyboard, a pointing device like a touchpad or a mouse, or another type of input hardware. The processor 114 executes computer-executable code 118 stored on the memory 116 to perform the techniques, methods, and processes described herein.

In general, an event 120 occurs at the remote computing system 102. The event 120 can reflect a problem or potential problem that is currently causing the remote system 102 to not properly operate at a hardware, software, or capacity level, or that if left unresolved will result in the remote system 102 not properly operating. In general, then, the event 120 can correspond to a condition that has occurred at the remote computing system 102 that requires resolution to ensure that the processing tasks assigned to the remote system 102 continue to be performed satisfactorily.

The remote computing system 102 sends a notification 122 of the event 120 over the network 106 to the computing device 104. Upon receipt of the event 120, the computing device 104 of the administrator heuristically determines an action 124 to resolve the event 120, without interaction with the administrator. That is, the determination of the action 124 is heuristic in that the computing device 104 determines the action to resolve the event 120 itself. Different approaches for heuristic determination of the action 124 are described later in the detailed description.

Upon determining the action 124 to resolve the event 120, the computing device 104 does the following in various orders according to different techniques described herein. The computing device 104 presents the action 124 via the display hardware 110 to the administrator of the computing device 104. This presentation 126 of the action can include a user interface element that the user can actuate via the input hardware 112. The computing device 104 also performs the action 124 on the remote computing system 102 to resolve the underlying event 120. The computing device 104 effectuates the performance 128 of the action 124 over the network 106, by communicating directly with the remote computing system 102. The order in which the performance 128 of the action occurs in relation to the presentation 126 of the action 124 depends on whether the computing device 104 is operating in a "permission" modality, a "forgiveness" modality, or a "partial permission or forgiveness" modality. Different techniques for the different modalities are described later in the detailed description.

As a concrete implementation example, the computing device 104 may be a smartphone or another type of handheld mobile computing device of the administrator, and the code 118 that the processor 114 executes to determine, present, and perform the action 124 may be in the form of a small computer program running on the device 104, such as an app. When the computing device 104 receives the notification 122 of the event 120 from the remote computing system 102 via the network hardware 108, the device 104 causes the app to run and passes the event 120 to the app. The app can present the event 120 in the form of a GUI notification that is displayed via the display hardware 110 regardless of whether the administrator is currently using the app. If the display hardware 110 is currently off, the computing device 104 may turn on the hardware 110 and vibrate or sound an audible alert to draw the administrator's attention to the presentation 126 of the action 124 to resolve the event 120. The app can cause performance 128 of the action 124 on the remote computing system 102 via the network hardware 108 as well.

Figure 2:
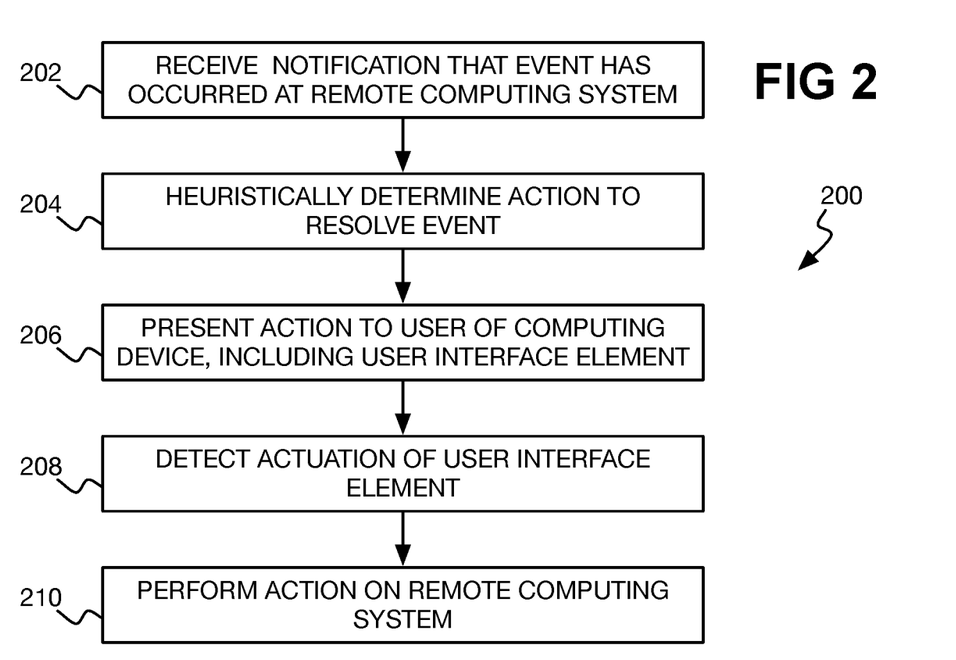
FIG. 2 is a flowchart of an example method for performing an action to resolve an event at a remote computing system in accordance with a "permission" modality.

FIG. 2 shows an example method 200 for resolving an event at a remote computing system in accordance with a "permission" modality. The method 200 can be performed by the computing device 104 in relation to an event 120 that has occurred at a remote computing system 102, as described. The computing device receives a notification from the remote computing system that an event has occurred at the remote computing system (202).

In response, the computing device heuristically determines an action to perform on the remote computing system to resolve the event (204). Heuristic determination of the action to perform to resolve the event can be achieved in a number of different ways. The event may have previously occurred at the remote computing system. In response to these prior occurrences of the event, the administrator may have invoked different actions to resolve the event. The most previously invoked action by the administrator responsive to these prior occurrences of the event at the remote computing system may be as the action in part 204, therefore. The most previously invoked action may be the previously invoked action that was most successful in resolving prior occurrences of the event. In one implementation, part 204 can include just the actions that the administrator invoked at or through the computing device itself to resolve the prior occurrences of the event at the remote computing system.

However, in another implementation, part 204 can also include the actions that the administrator directly invoked at the remote computing system, regardless of whether the actions where invoked through the computing device or in another manner. For instance, the administrator may have used a different computing device to log onto a web interface of the remote computing system to invoke actions to resolve prior occurrences of the event. As another example, the administrator may have directly connected a keyboard to the remote computing system to access a command line interface (CLI) of the remote system, or may have otherwise accessed the CLI of the remote system without using the computing device performing the method 200. The computing device thus may receive from the remote computing system, such as at the same time the notification of the latest occurrence of the event is received, the actions the administrator invoked to resolve the prior occurrences of the event.

In a third implementation, part 204 can include the actions invoked by any user to resolve prior occurrences of the event, and not just those that the administrator of the computing device performing the method 200 invoked. Similarly, in another implementation, part 204 can include the actions performed on any remote computing system to resolve prior occurrences of the event, and not just the actions performed on the remote system at which the event has just occurred. The computing device may perform part 204 in a graduated manner as well.

For example, if there is a minimum number of previous actions that the administrator has invoked through the computing device to resolve prior occurrences of the event, then the computing device may consider just these actions. If there is not, then the computing device may also consider the actions invoked by the administrator on the remote computing system regardless of whether the administrator invoked them through the computing device or not. If there is still not a minimum number of previous actions, then the computing device may enlarge the total number of actions to consider to include those invoked by any user on the remote computing system to resolve prior occurrences of the event. Finally, if the result still does not satisfy the minimum number of previous actions to consider, then the computing device may also consider the actions invoked on other remote computing system to resolve prior occurrences of the event, either by the administrator him or herself, or by other users.

The computing device presents the heuristically determined action to the administrator (i.e., the user) of the computing device (206), including a user interface element that the administrator can actuate to select the action. For example, the action may be displayed as an alert on the computing device, including the event that occurred at the remote computing system that performance of the action is to resolve. This user interface element can include selectable buttons or other controls by which the administrator can approve performance of the action, or disapprove performance of the action. Responsive to detecting actuation of the user interface element corresponding to approval of the presented action (208), the computing device performs the action on the remote computing system over the network to resolve the event at the remote system (210). For example, the computing device may automatically log into the remote computing system's CLI using the administrator's previously supplied credentials, and enter in commands to perform the approved action.

Figure 3:
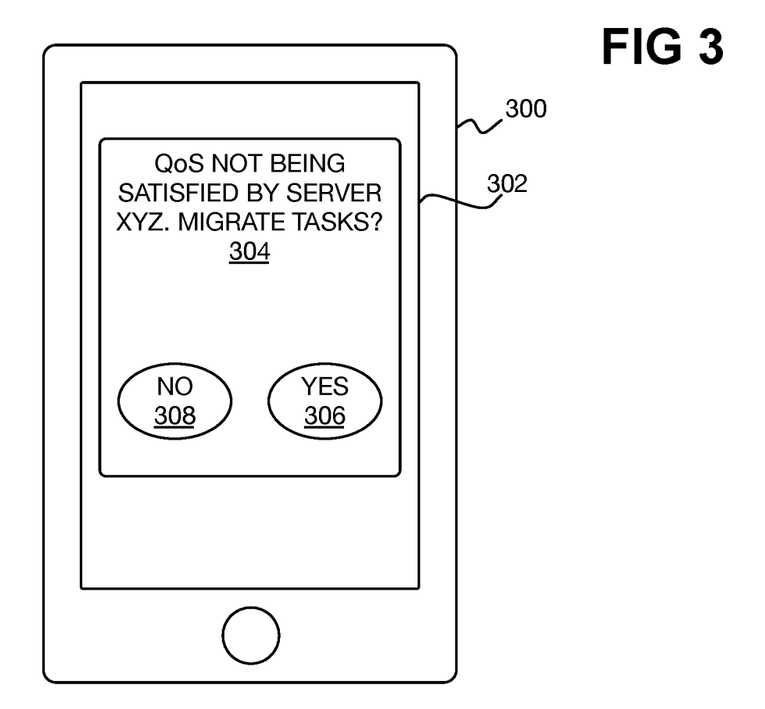
FIG. 3 is a diagram of an example computing device that illustratively depicts partial performance of the method of FIG. 2 by the computing device.

FIG. 3 shows an example computing device 300 that illustrates part 206 of the method 200. The computing device 300 may be a smartphone or other mobile computing device, and includes a touchscreen 302, which serves as both the display hardware and the input hardware of the device 300. A notification 304 is displayed on the touchscreen 302, which identifies the event that occurred at the remote computing system and the remote system itself ("QoS not being satisfied at server XYZ"), and that also proposes performance of the action that the computing device 300 has heuristically determined ("migrate tasks?"). The notification 304 includes two actuatable controls 306 and 308: a "yes" control 306 that the user actuates to approve performance of the action, and a "no" control 308 that the user actuates to disapprove performance of the action. If the user actuates the "yes" control 306 by pressing the touchscreen 302 where the control 306 is displayed, the computing device 300 removes display of the notification 304 and migrates tasks away from the remote computing system to a different computing system, to resolve the issue that QoS targets are not being satisfied at the remote system. If the user selects the "no" control 308 instead, the computing device 300 removes display of the notification 304 and does not perform this action.

In one implementation, the heuristically determined action may be an action that can be partially performed prior to actually committing the action in its entirety on the remote computing system. For example, consider the action of migrating processing tasks from a VM running on the remote computing system to a new VM running on another, second computing system. This action can be considered as having two action parts: a first part of deploying a new VM on the second computing system, and once the new VM has been deployed and started, a second part of shutting down the processing tasks in question at VM on the remote computing system, moving them to the new VM on the second computing system, and restarting the tasks on the new VM. The first part can be performed without committing the action in its entirety. That is, deploying a new VM on the second computing system does not affect the processing tasks at the VM running on the remote computing system.

Therefore, even in the "permission" modality, the new VM may be deployed automatically without user approval, but the processing tasks may not be migrated from the VM running on the remote computing system to the new VM until and unless the administrator approves this proposed action. Advantageously, if and when the administrator approves the proposed action, migration is likely to occur more quickly. This is because while the administrator is contemplating whether to approve the action, the action is being partially performed. If and when the administrator does provide approval, the first part of the action may indeed have already been completed. Further, if the user does not provide approval, the first part of the action can be rolled back without affecting the current state of the remote computing system with respect to the event. For example, the new VM that has been deployed on the second computing system can be deactivated, and such deployment and subsequent deactivation of the new VM does not affect the processing tasks on the VM running on the remote computing system.

Figure 4:
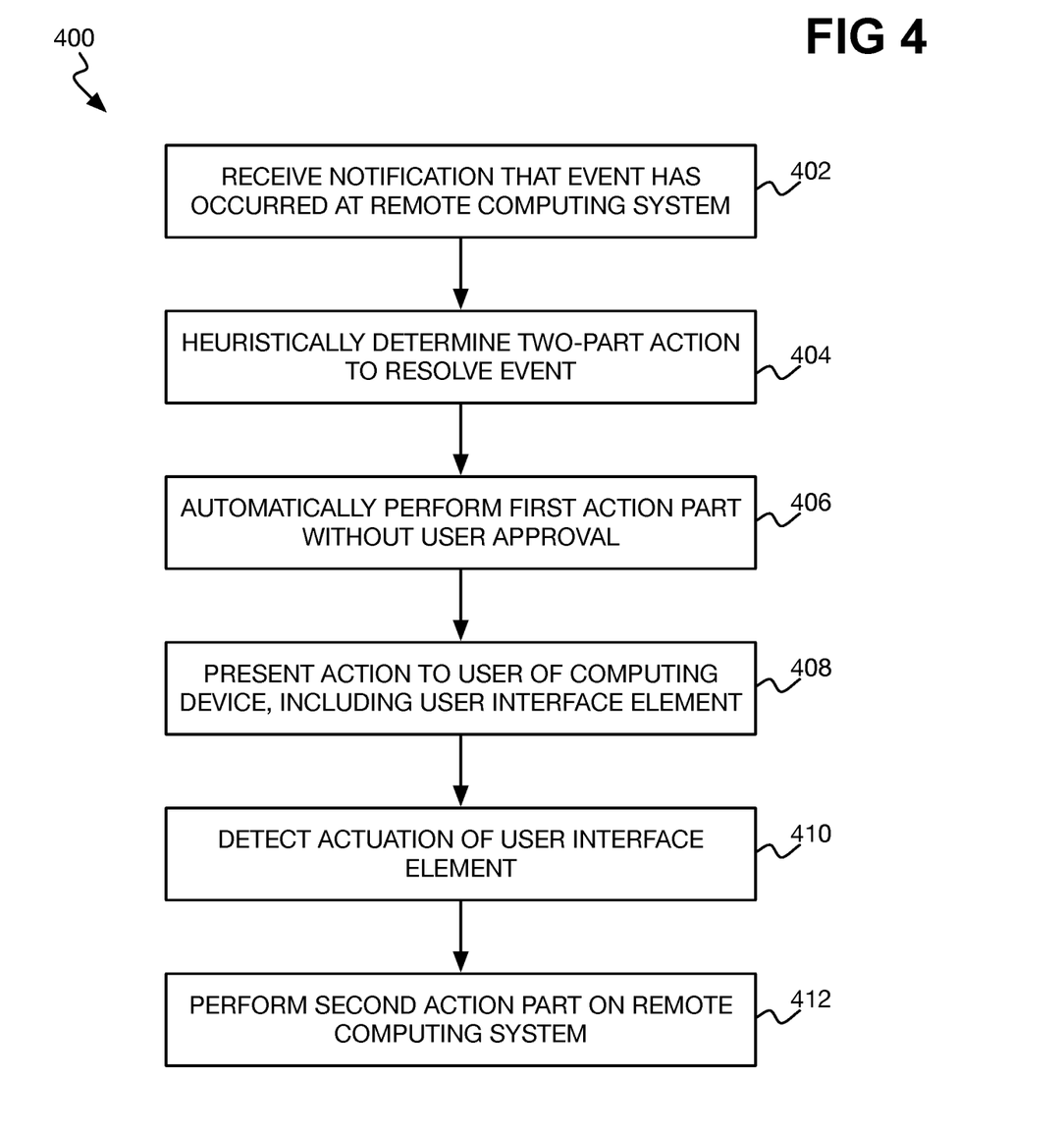
FIG. 4 is a flowchart of an example method for performing a two-part action to resolve an event at a remote computing system in accordance with a "permission" modality.

FIG. 4 shows an example method 400 for resolving an event at a remote computing system in accordance with a "permission" modality, where the heuristically determined action is such a two-part action. The method 400 may thus be considered a special case of the method 200, where the action that the computing device performing the method 200 heuristically determines is a two-part action. The first part of action can be performed without committing the action in its entirety at the remote computing system. The second part is performed after the first part, and then commits the action at the remote computing system.

The computing device receives a notification that an event has occurred at a remote computing system (402), as in the method 200. The computing device heuristically determines a two-part action to resolve the event (404). The first part of the action is automatically performed without administrator (i.e., user) approval (406). The computing device presents the action to the administrator of the computing device, including a user interface element (408), as in the method 200. When the computing device detects actuation of the user interface element corresponding to approval of the proposed action (410), the computing device at that time responsively performs the second part of the action to commit the action on the remote computing system (412).

In both example "permission" modality methods 200 and 400 that have been described, the administrator is presented with a single action to approve for performance on the remote computing system. However, in another implementation, the computing device may present the administrator with more than one action. The administrator may then select which action the computing device is to perform on the remote computing system to resolve the event that has occurred.

Figure 5:
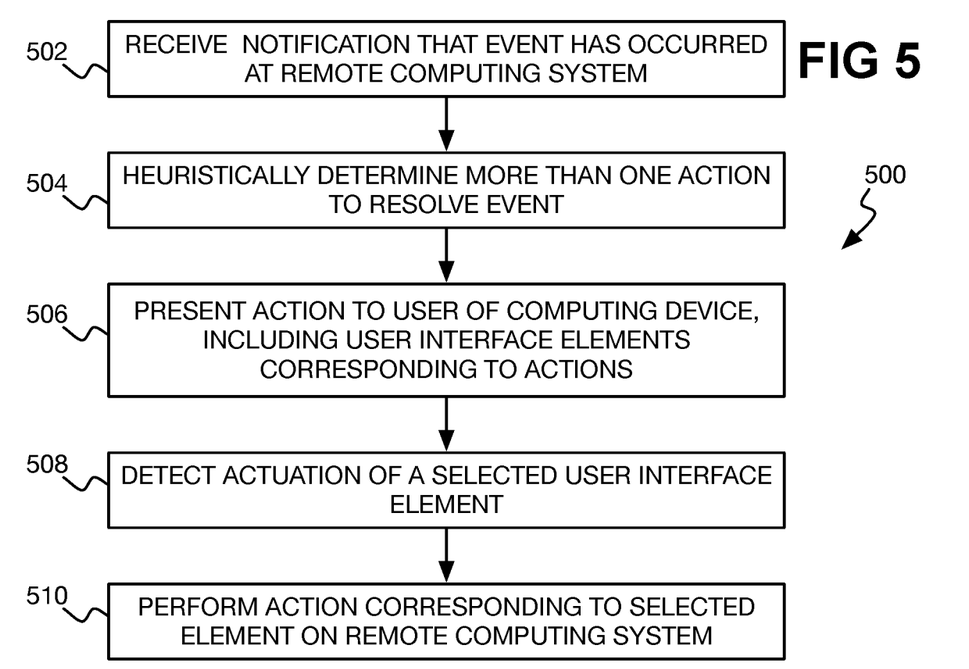
FIG. 5 is a flowchart of an example method for performing an action to resolve an event at a remote computing system in accordance with a "permission" modality, in which a user is presented with multiple actions from which to select.

FIG. 5 shows an example method 500 for resolving an event at a remote computing system in accordance with such a "permission" modality, in which the administrator is presented with multiple actions from which to select for performance on the remote computing system. The method 500 may thus be considered another special case of the method 200, where multiple actions are selected for presentation to the administrator. The computing device receives a notification that an event has occurred at a remote computing system (502), as in the method 200.

The computing device heuristically determines more than one action that can each resolve the event (504). For example, more than one action may have previously been invoked to resolve prior occurrences of the event, and a number of these actions may have been performed at a frequency of greater than a threshold percentage, a number of times greater than a threshold number, or at a success rate greater than a threshold success rate. Therefore, in one implementation, if more than one action has previously been performed to resolve prior occurrences of the event greater than a threshold (by frequency, absolute number, or success rate, for instance), then the approach of method 500 is used in lieu of that of the method 200. The computing device, however, may be able to display just a limited number of actions, due to its relatively small screen size. Therefore, just a predetermined number of such actions, such as those that have been performed the most or those that were most successful in resolving the event, are ultimately actually selected, or determined, by the computing device for presentation to the administrator.

As a concrete example, the computing device may be able to display just three actions. Thus, three previously invoked actions to resolve prior occurrences of the event may be selected. Alternatively, up to three previously invoked actions may be selected. For instance, if just two actions have been performed greater than a threshold (by frequency, absolute number, or success rate), then just these two previously invoked actions may be selected to present to the administrator.

The actions are presented to the administrator (i.e., user) of the computing device, including a user interface element corresponding to each action (506). Each user interface includes an indicator corresponding to how often or how successful the corresponding action was previously invoked. The indicator may be a numeric percentage of the frequency or success rate at which the corresponding action was previously invoked to resolve prior occurrences of the event, or a graphical indicator denoting this percentage. The presented indicators provide the administrator with a sense for which actions were most often or most successfully performed when the event previously occurred. The computing device detects actuation of one of these presented user interface elements (508), and responsively performs the action on the remote computing system that corresponds to the selected element to resolve the event.

Figure 6:
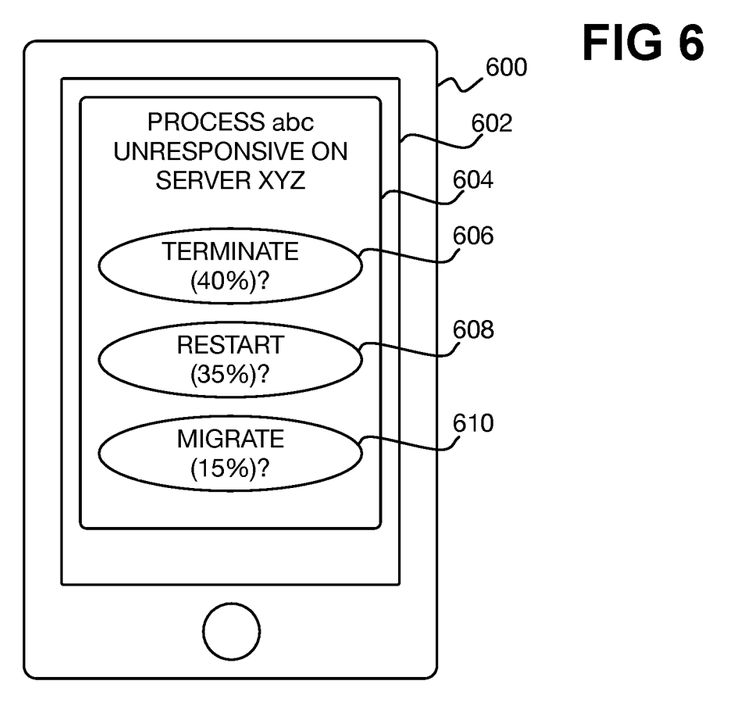
FIG. 6 is a diagram of an example computing device that illustratively depicts partial performance of the method of FIG. 5 by the computing device.

FIG. 6 shows an example computing device 600 that illustrates part 506 of the method 500. The computing device 600 can be a smartphone or other mobile computing device, and includes a touchscreen 602, which serves as both the display hardware and the input hardware of the device 600. A notification 604 is displayed on the touchscreen 602, which identifies the event that occurred at the remote computing system and the remote computing system itself ("Process abc is unresponsive on server XYZ").

The notification 604 includes three actuatable user interface elements, or controls, 606, 608, and 610 corresponding to three heuristically determined actions. The element 606 corresponds to the action of terminating the process on the server, and has an indicator denoting that this action was performed 40% of the time to resolve prior occurrences of the event. The element 608 corresponds to the action of restarting the process on the server, and has an indicator denoting that this action was performed 35% of the time. The element 610 corresponds to the action of migrating the process to a different server, and has an indicator denoting that this action was performed 15% of the time previously.

The three percentages do not add up to 100% in the example. This means that other actions were also previously performed to resolve prior occurrences of the event, but have not been presented to the administrator. This may be because the other actions were not performed a number of times or at a frequency lower than a threshold. This may also or alternatively be because the size of the touchscreen 602 is sufficiently limited to just permit the display of user interface elements corresponding to three actions. In any case, the user selects one of the elements 606, 608, and 610, by pressing the touchscreen 302 where the desired element 606, 608, or 610 is displayed, and the computing device 600 correspondingly removes the notification 604 from the touchscreen 602 and performs the action corresponding to the selected element on the remote computing system.

Figure 7:
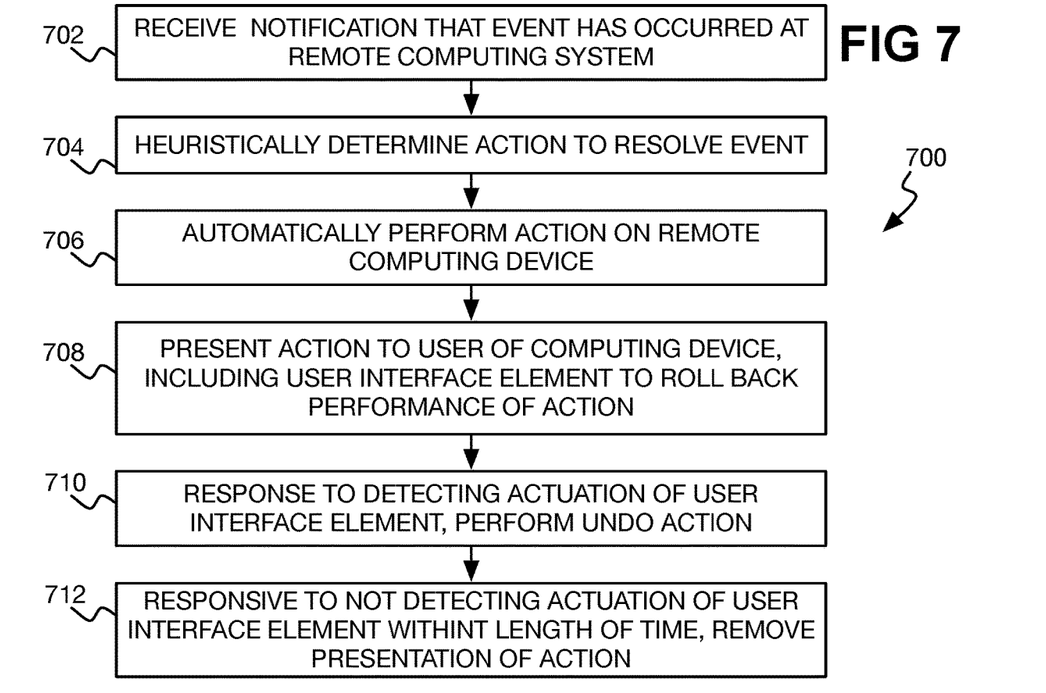
FIG. 7 is a flowchart of an example method for performing an action to resolve an event at a remote computing system in accordance with a "forgiveness" modality.

In comparison with the methods 200, 400, and 500 of FIGS. 2, 4, and 5, which depict event resolution according to a "permission" modality, FIG. 7 shows an example method 700 for resolving an event at a remote computing system in accordance with a "forgiveness" modality. The method 700 can be performed by the computing device 104 in relation to an event 120 that has occurred at a remote computing system 102, as described above in relation to FIG. 1. The computing device receives a notification from the remote computing system that an event has occurred at the remote computing system (702), and heuristically determines an action to perform on the remote computing system to resolve the event (704), as in parts 202 and 204 of the method 200.

However, the computing device automatically performs the action on the remote computing system (706). The computing device does not first receive approval from the administrator prior to performing the action in part 706 in this "forgiveness" modality, in contradistinction to the "permission" modality in which the device does not perform the action (at least completely) until receiving administrator approval. The administrator may be unaware that the event has occurred at the remote computing system, and the computing device does not inform the administrator that the device is performing the resolving action, prior to performing the action. The administrator may thus be unaware that the action will be, or is being, performed.

After at least initiating performance of the action, and in some implementations after the action has been completed, the computing device presents the action to the administrator (i.e., user) of the computing device (708), including a user interface element that the administrator can actuate to roll back performance of the action. For example, the action may be displayed as an alert on the computing device, including the event that occurred at the remote computing system and that performance of the action is intended to resolve. The user interface element can include selectable buttons or other controls by which the administrator can disapprove performance of the action, or approve performance of the action.

Responsive to detecting actuation of the user interface element corresponding to disapproval of the presented action, the computing device performs an undo action on the remote computing system over the network to roll back the action that has been performed (710). The remote computing system is thus rolled back to its state prior to the action having been performed in part 706. As such, the effect of parts 706, 708, and 710 is the computing device seeking "forgiveness" for having performed an action without first receiving administrator approval. The "forgiveness" modality is appropriate for actions that can indeed be rolled back by performing corresponding undo actions. For example, processing tasks migrated from the remote computing system to another computing system can be migrated back to the remote computing system. The "forgiveness" modality is inappropriate for actions that cannot be reversed after having been performed, by comparison.

In one implementation, if the user does not actuate any user interface element within a length of time after the action was presented in part 708, then the computing device removes presentation of the action and any user interface element(s) that the device displayed in part 708 (710). For example, if the computing device displayed a notification on the device's display, once a predetermined length of time has passed, the computing device may remove the notification from the display. That is, the computing device ceases to display the notification. In this implementation, the lack of disapproval of performance of the action can be construed as implicit and passive approval of performance of the action. An undo action is not performed, and the action is not rolled back. This implementation may be appropriate for actions that can be rolled back just a certain length of time after they have been performed, and become irreversible at some point in time.

Figure 8:
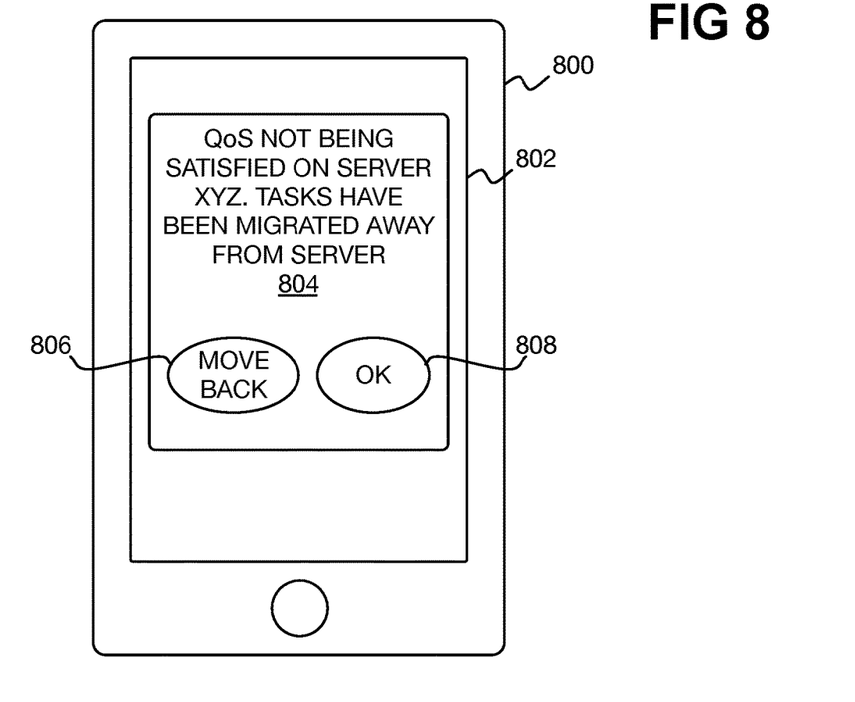
FIG. 8 is a diagram of an example computing device that illustratively depicts partial performance of the method of FIG. 7 by the computing device.

FIG. 8 shows an example computing device 800 that illustrates part 708 of the method 700. The computing device 800 can be a smartphone or other mobile computing device, and includes a touchscreen 802, which serves as both the display hardware and the input hardware of the device 800. A notification 804 is displayed on the touchscreen 802, which identifies the event that occurred at the remote computing system and the remote computing system itself ("QoS not being satisfied on server XYZ"). The notification 804 also identifies the action that the computing device performed on the remote computing system to resolve this event ("tasks have been migrated away from server"). The notification 804 includes two actuatable user interface elements, or controls, 806 and 808.

The element 806 corresponds to disapproval of the action that has been performed ("move back"). If the administrator selects the element 806, by pressing the touchscreen 804 where the element 806 is displayed, the computing device 800 detects such actuation and responsively performs an undo action to roll back performance of the action that the device has already performed. In the example of FIG. 8, the tasks that were migrated away from the server are migrated, or moved, back to the server. By comparison, the element 808 corresponds to approval of the action that has been performed ("ok"). If the administrator selects the element 808, the computing device 800 removes display of the notification 804 from the touchscreen 802, and does not perform an undo action. The computing device 800 may also cease displaying the notification 804 on the touchscreen 802 after a length of time has passed, and not perform an undo action to roll back the action that the device 800 performed to resolve the event.

The "forgiveness" modality thus differs from the "permission" modality. The latter modality does not perform the action (or at least completely perform the action) until and unless the administrator has signified approval. The former modality automatically performs the action, and then notifies the administrator, who has at least a limited length of time to signify disapproval, which results in an undo action being performed to roll back performance of the action.

Figure 9:
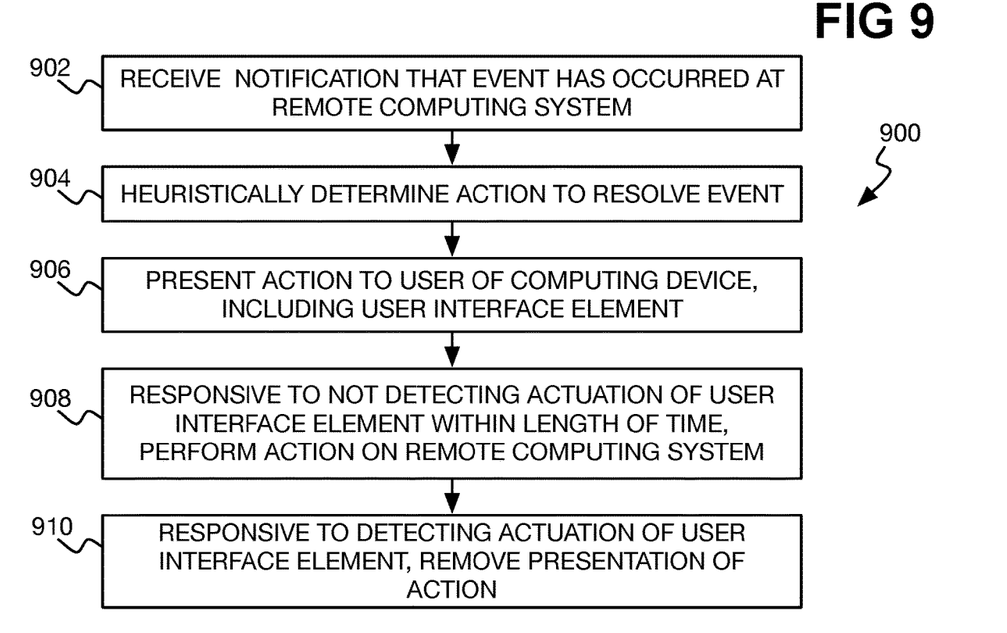
FIG. 9 is a flowchart of an example method for performing an action to resolve an event at a remote computing system in accordance with a "partial permission" modality.

By comparison, FIG. 9 shows an example method 900 for resolving an event at a remote computing system in accordance with a "partial permission" modality. The method 900 can be performed by the computing device 104 in relation to an event 120 that has occurred at a remote computing system

102, as described above in relation to FIG. 1. The computing device receives a notification from the remote computing system that an event has occurred at the remote computing system (902), and heuristically determines an action to perform on the remote computing system to resolve the event (904), as has been described.

The computing device then presents the action to the administrator (i.e., user) of the computing device (906), including a user interface element that the administrator can actuate. The user interface element is actuated by the administrator to signal to the computing device that the administrator does not want the action performed. However, if the administrator fails to actuate the action within a length of time after the action is displayed to the administrator along with the user interface element, the computing device automatically performs the action. In the method 900, then, the computing device partially seeks permission prior to performing the action, in effect. If the administrator does not affirmatively indicate that the action should not be performed, the computing device proceeds to perform the action, even if the administrator has not affirmatively approved the action.

The action may be displayed as an alert on the computing device, including the event that occurred at the remote computing system and the action that the computing device intends to perform to resolve the event. The user interface element can include at least a selectable button or other control by which the administrator can indicate that the computing device is not to perform the action. Even though the action is automatically performed if the administrator does not select this button, the user interface element may also include another selectable button or other control that the administrator can actuate to approve performance of the action, where such affirmative approval of the action can result in the computing device immediately proceeding to perform the action.

Therefore, responsive to not detecting actuation of the user interface corresponding to disapproval of the proposed action, within a length of time after the action has been presented in part 906, the computing device automatically performs the action on the remote computing system (908). The computing device may also subsequently remove presentation of the action and the user interface elements that were displayed in part 906. However, if the computing device detects actuation of the user interface element corresponding to disapproval of the proposed action, within the length of time after the action has been presented, the computing device removes presentation of the action and the user interface elements that have been displayed (910), and does not perform the action on the remote computing system.

Figure 10:
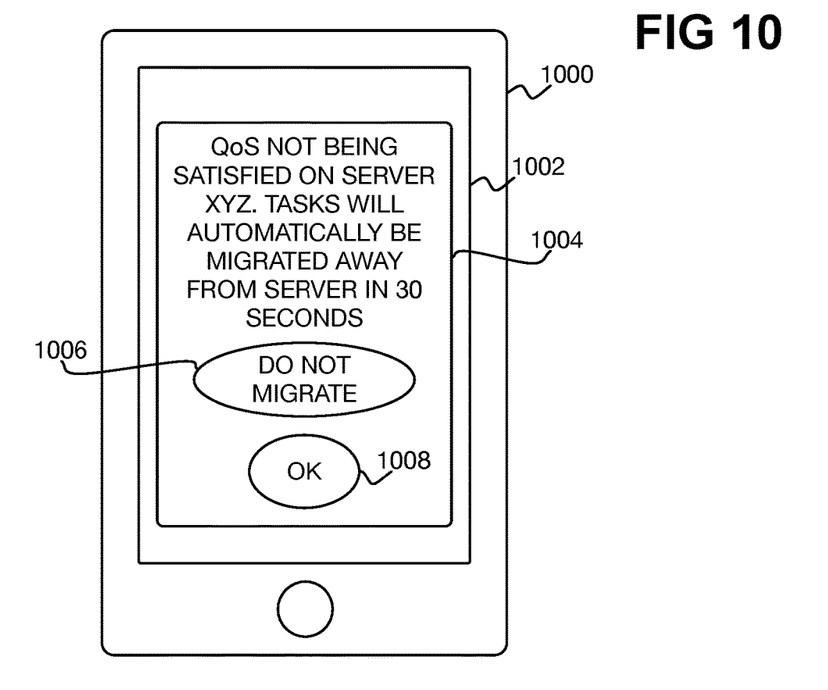
FIG. 10 is a diagram of an example computing device that illustrative depicts partial performance of the method of FIG. 9 by the computing device.

FIG. 10 shows an example computing device 1000 that illustrates part 906 of the method 900. The computing device 1000 can be a smartphone or other mobile computing device, and includes a touchscreen 1002, which serves as both the display hardware and the input hardware of the device 1000. A notification 1004 is displayed on the touchscreen 1002, which identifies the event that occurred at the remote computing system and the remote computing system itself ("QoS not being satisfied on server XYZ"). The notification 1004 also identifies the action that the computing device 1000 will perform on the remote computing system to resolve the event if the administrator does not affirmatively indicate otherwise within a given length of time ("tasks will automatically be migrated away from server in 30 seconds"). The length of time may automatically count down within the notification 1004. For example, the display of "30 seconds" may be updated to "29 seconds" after the passage of one second, then to "28 seconds" after another second passes, and so on.

The notification 1004 includes two actuatable user interface elements, or controls, 1006 and 1008. The element 1006 corresponds to disapproval of the proposed action ("do not migrate"). If the administrator selects the element 1006 before the specified length of time has elapsed, by pressing the touchscreen 1002 where the element 1006 is displayed, the computing device 1000 detects this actuation and responsively does not perform the proposed action on the remote computing system. The computing device 1000 further ceases displaying the notification 1004 on the touchscreen 1002. If the administrator instead selects the element 1008, the computing device 1000 may immediately perform the proposed action without waiting for the specified length of time to elapse, and remove the notification 1004 from the touchscreen 1002. If the length of time elapses without the administrator selecting either element 1006 or 1008, then the computing device 1000 performs the proposed action automatically with tacit user approval, and removes the notification 1004 from the touchscreen 1002.

The "permission," "forgiveness," and "partial permission" modalities have been described separately. However, two or more of modalities may be employed in the same implementation. As the computing device receives approval of its proposed action to resolve a particular event in the "permission" modality, the computing device may transition to the "partial permission" modality, and ultimately to the "forgiveness" modality for subsequent occurrences of the event. Similarly, as the computing device receives disapproval of its action to resolve an event in the "forgiveness" modality, the computing device may transition back to the "partial permission," and ultimately to the "permission" modality for subsequent occurrences of the event. That is, the computing device attempts to transition among the modalities in accordance with its accuracy in heuristically determining an action to resolve an event that the administrator approves.

Figure 11:
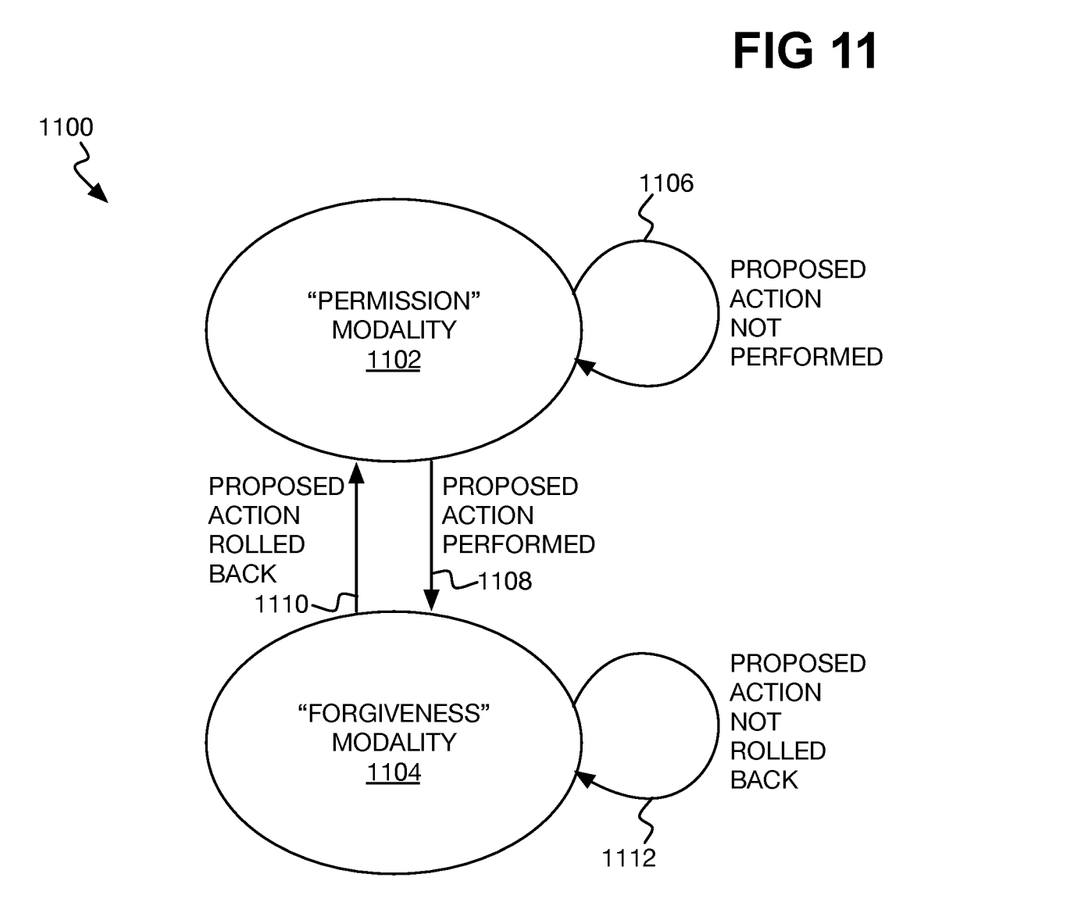
FIG. 11 is a diagram of an example process flow for transitioning between "permission" and "forgiveness" modalities for performing an action to resolve recurrences of an event at a remote computing system.

FIG. 11 shows a process flow 1100 for transitioning between "permission" and "forgiveness" modalities 1102 and 1104, respectively. The computing device may start in the "permission" modality 1102 when receiving notification of an event from a remote computing system. As such, the computing device heuristically determines an action to resolve the event, but does not perform the action unless the administrator approves it. When the event recurs, if the administrator did not approve the previously proposed action, the computing device remains in the "permission" modality 1102, per edge 1106 of the process flow 1100.

However, if the administrator did approve the previously proposed action, then when the event recurs, the computing device transitions from the "permission" modality 1102 to the "forgiveness" modality 1104, per edge 1108 of the process flow 1100. As such, the computing device automatically performs a heuristically determined action without administrative approval responsive to this occurrence of the event. Another occurrence of the event results in the computing device staying in the "forgiveness" modality 1104 if the administrator did not roll back the previously performed action, per edge 1112 of the process flow 1100. However, if the administrator did roll back the previously performed action, the additional occurrence of the event results in the computing device transitioning back to the "permission" modality 1102 to respond to the event, per edge 1110 of the process flow 1100.

Figure 12:
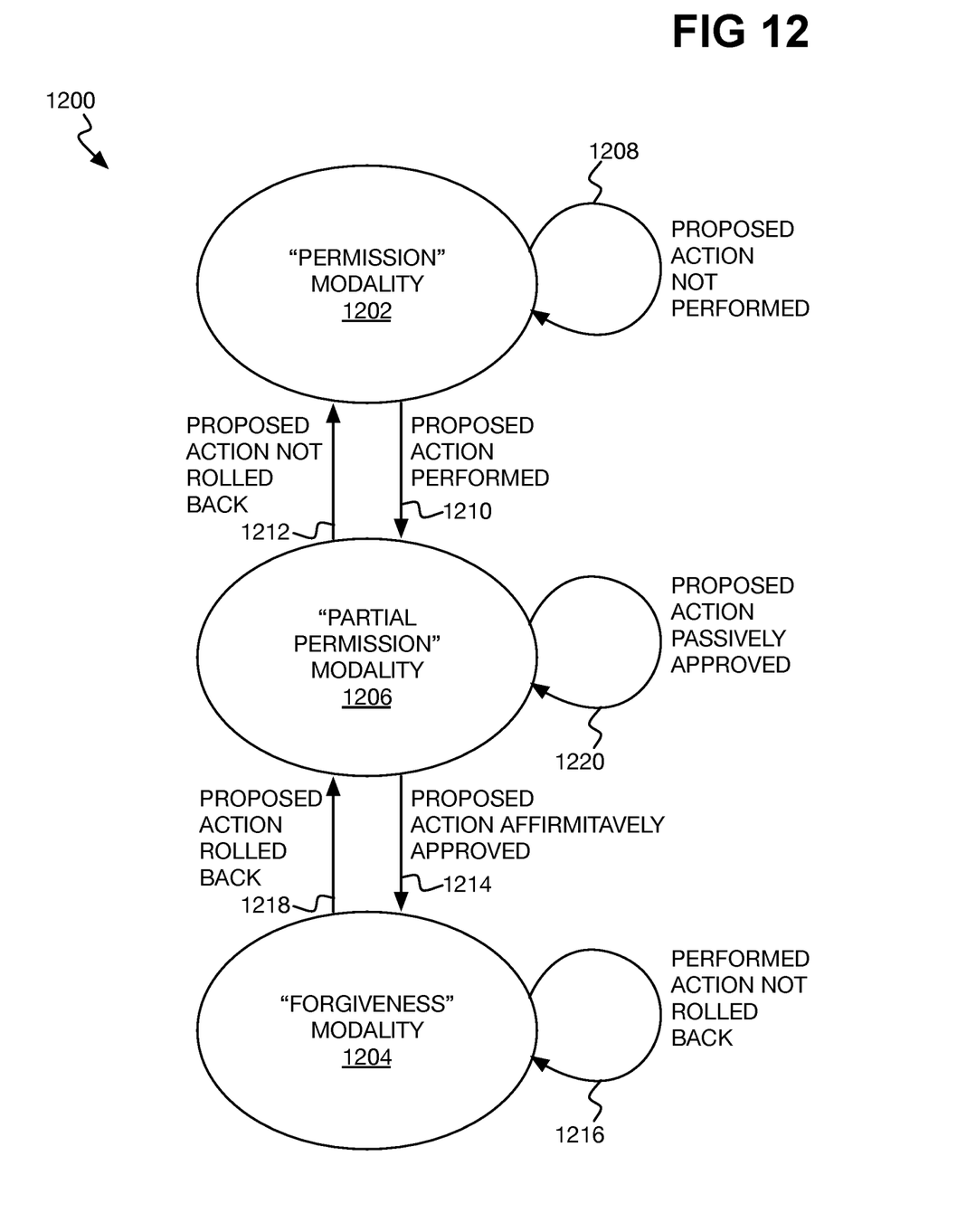
FIG. 12 is a diagram of an example process flow for transitioning among "permission," "forgiveness," and "partial permission" modalities for performing an action to resolve recurrences of an event at a remote computing system.

FIG. 12 shows a process flow 1200 for transitioning among "permission," "forgiveness," and "partial permission" modalities 1202, 1204, and 1206, respectively. The computing device may again start in the "permission" modality 1202 when receiving notification of an event from a remote computing system. The computing device thus heuristically determines an action to resolve the event, but does not perform the action unless the administrator approves it. When the event recurs, if the administrator did not approve the previously proposed action, the computing device remains in the "permission" modality 1202, per edge 1208 of the process flow 1200.

However, if the administrator did approve the previously proposed action, then when the event reoccurs, the computing device transitions from the "permission" modality 1202 to the "partial permission" modality 1206, per edge 1210 of the process flow 1200. The computing device proposes a heuristically determined action, and automatically performs the action if the administrator does not affirmatively disapprove the action with a specified length of time. Another occurrence of the event can result in the computing device staying in the "partial permission" modality 1206 if the administrative passively approved the proposed action, per edge 1220 of the process flow 1200. That is, the administrator did not affirmatively approve the proposed action by selecting a user interface element; rather, the proposed action was automatically performed as a result of the length of time elapsing. By comparison, if the administrator did affirmatively approve the proposed action, the additional occurrence of the event can instead result in the computing device transitioning to the "forgiveness" modality 1204, per edge 1214 of the process flow 1200. If the proposed action was not performed due to the administrator affirmatively disapproving the action, then the computing device transitions from the "partial permission" modality 1206 back to the "permission" modality 1202, per edge 1212 of the process flow 1200.

After the computing device has handled an event in the "forgiveness" modality 1204, if the administrator did not roll back the heuristically determined action, then the computing device remains in the "forgiveness" modality 1204 for the next occurrence of the event at the remote computing system, per edge 1216 of the process flow 1200. However, if the administrator did roll back the action, then the computing device transitions back to the "partial permission" modality 1206 for the next occurrence of the event, per edge 1218 of the process flow 1200. In another implementation, roll back of the action results in transitioning from the "forgiveness" modality 1204 to the "permission" modality 1202 instead to handle the next occurrence of the event.

The techniques that have been disclosed improve remote computing system event resolution technology. Events occurring at a remote computing system can be resolved more quickly according to these techniques. The administrator does not have to learn of the event in one way (such as by reviewing a syslog of the remote computing system periodically received by email), and respond to the event in another way (such as by accessing the CLI of the remote system). The events can further be resolved in accordance with various modalities as the heuristically determined actions meet administrator approval or disapproval.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
   receiving, by a computing device from a remote computing system over a network, a notification that an event has occurred again at the remote computing system after receiving a notification of at least one previous occurrence of the event, wherein in response to the notification of the occurrence of the previous event, a user initiated an action was performed to resolve the previous event at the remote computing system;
   determining, by the computing device, an action to resolve the event at the remote computing system;
   automatically performing, by the computing device, the action on the remote system over the network to resolve the event without first obtaining approval from a user of the computing device;
   in response to automatically performing the action, presenting, by the computing device, the action automatically performed to the user, including a user interface element actuatable by the user to roll back performance of the action; and
   responsive to detecting actuation of the user interface element, performing, by the computing device, an undo action on the remote computing system over the network to roll back the performance of the action.

2. The method of claim 1, wherein the action comprises:
   a first action part performable without committing the action at the remote computing system; and
   a second action part performed after the first action part, performance of the second action part committing the action at the remote computing system,
   wherein automatically performing the action comprises automatically performing the first action part on the remote computing system over the network,
   wherein the user interface element comprises a rollback user interface element and the method further comprises presenting to the user an acceptance user interface element actionable by the user to accept the first action part automatically performed,
   wherein responsive to detecting actuation of the rollback user interface element, performing, by the computing device, the undo action on the remote computing system over the network to roll back the performance of the first action part,
   and wherein responsive to detecting the actuation of the acceptance user interface element, performing, by the computing device, the second action part on the remote computing system over the network to commit the action at the remote computing system.

3. The method of claim 1, wherein determining the action comprises:
   determining, as the action, a previously invoked action that was most successful in resolving prior occurrences of the event at the remote computing system.

4. The method of claim 1, wherein determining the action comprises:
   determining, as the action, a most previously invoked action by the user responsive to prior occurrences of the event at the remote computing system.

5. The method of claim 4, wherein determining the most previously invoked action by the user comprises:
determining the most previously invoked action from a plurality of previously invoked actions that the user invoked through the computing device to resolve the prior occurrences of the event at the remote computing system.

6. The method of claim 4, wherein determining the most previously invoked action by the user comprises:
receiving, by the computing device from the remote computing system over the network, a plurality of previously invoked actions that the user directly invoked at the remote computing system to resolve the prior occurrences of the event; and
determining the most previously invoked action from the previously invoked actions that the user directly invoked at the remote computing system and from a plurality of previously actions that the user invoked through the computing device to resolve the prior occurrences of the event at the remote computing system.

7. The method of claim 1, wherein determining the action comprises:
determining, as the action, a most previously invoked action by any user responsive to prior occurrences of the event at the remote computing system.

8. The method of claim 1, wherein determining the action comprises:
determining a predetermined number of previously invoked actions by the user responsive to prior occurrences of the event at the remote computing system,
wherein presenting the action automatically performed to the user, including the user interface element actuatable by the user to roll back the action, comprises:
presenting the predetermined number of previously invoked actions to the user, including an indicator for each previously invoked action corresponding to one of how often the previously invoked action was selected and how often the action was successful in resolving the event at the remote computing system and indicating which of the previously invoked actions is the action that was automatically performed, and including a different user interface element for each previously invoked action actuatable by the user to select the previously invoked action,
wherein detecting the actuation of the user interface element comprises:
detecting actuation of one of the different user interface elements by the user,
wherein performing the action on the remote computing system over the network comprises one of:
rolling back the automatically performed action and performing the previously invoked action corresponding to the one of the different user interface elements actuated by the user responsive to detecting actuation of a user interface element corresponding to a previously invoked action different from the automatically performed action; and
performing no further action responsive to detecting actuation of the user interface element corresponding to the automatically performed action, and wherein the predetermined number is greater than one.

9. The method of claim 1, wherein in response to the first notification of the occurrence of the previous event and performance of the user initiated action comprises:

receiving, by the computing device from the remote computing system over the network, the first notification that the previous event has occurred at the remote computing system;
determining, by the computing device, an action to resolve the previous event at the remote computing system;
presenting, by the computing device, the action to the user of the computing device, including a user interface element actuatable by the user to disapprove performance of the action;
responsive to failing to detect actuation of the user interface element within a length of time after presenting the action to the user, automatically performing, by the computing device, the action on the remote computing system over the network to resolve the previous event at the remote computing system without first obtaining approval from the user; and
responsive to detecting actuation of the user interface element within the length of time after presenting the action to the user, removing, by the computing device, presentation of the action, including the user interface element, and not performing the action on the remote computing system.

10. The method of claim 1, wherein the notification is a second notification that the event has occurred again at a remote computing system after a previous occurrence of the event and the action is a second action and further comprising:
receiving, by the computing device from the remote computing system over the network, a first notification that the previous event has occurred at the remote computing system;
determining, by the computing device, a first action to resolve the event at the remote computing system;
presenting, by the computing device, the first action to the user of the computing device, including a user interface element actuatable by the user to select the first action; and
responsive to detecting actuation of the user interface element by the user, performing, by the computing device, the first action on the remote computing system over the network to resolve the event at the remote computing system, wherein the first action is the same as the second action.

11. A computer-readable non-transitory data storage medium storing computer-executable code that a computing device executes to:
receive, from a remote computing system over a network, a notification that an event has occurred again at the remote computing system after the computing device executes computer-executable code to receive a notification of at least one previous occurrence of the event, wherein in response to the notification of the occurrence of the previous event, the computing device executes computer-executable code to perform a user initiated an action to resolve the previous event at the remote computing system;
determine an action to resolve the event at the remote computing system;
automatically perform the action on the remote computing system over the network to resolve the event at the remote computing system without first obtaining approval from a user;
in response to automatically performing the action, present the action to the user of the computing device, including a user interface element actuatable by the user to roll back performance of the action; and
responsive to detecting actuation of the user interface element, perform, by the computing device, an undo action on the remote computing system over the network to roll back the performance of the action.

12. The computer-readable data storage medium of claim 11, wherein the computing device is configured to determine the action by:
determining, as the action, a most previously invoked action by the user responsive to prior occurrences of the event at the remote computing system.

13. The computer-readable data storage medium of claim 12, wherein the computing device is configured to determine the most previously invoked action by the user by:
determining the most previously invoked action from a plurality of previously invoked actions that the user invoked through the computing device to resolve the prior occurrences of the event at the remote computing system.

14. The computer-readable data storage medium of claim 12, wherein the computing device executes the computer-executable code to further:
receive, from the remote computing system over the network, a plurality of previously invoked actions that the user directly invoked at the remote computing system to resolve the prior occurrences of the event,
wherein the computing device is configured to determine the most previously invoked action by the user by:
determining the most previously invoked action from the previously invoked actions that the user directly invoked at the remote computing system and from a plurality of previously actions that the user invoked through the computing device to resolve the prior occurrences of the event at the remote computing system.

15. The computer-readable data storage medium of claim 11, wherein the computing device is configured to determine the action by:
determining, as the action, a most previously invoked action by any user responsive to prior occurrences of the event at the remote computing system.

16. The computer-readable data storage medium of claim 11, wherein the computing devices executes the computer-executable code to further, after performing the undo action on the remote computing system:
receive, from the remote computing system over the network, a notification that the event has again occurred at the remote computing system;
present the action to the user of the computing device, including a user interface element actuatable by the user to select the action; and
responsive to detecting actuation of the user interface element by the user, perform the action on the remote computing system over the network to resolve the event at the remote computing system.

17. The computer-readable data storage medium of claim 11, wherein in response to the first notification of the occurrence of the previous event and performance of the user initiated action comprises:
receive, from the remote computing system over the network, the first notification that the previous event has occurred at the remote computing system;
determine, by the computing device, an action to resolve the previous event at the remote computing system;
present the action to the user of the computing device, including a user interface element actuatable by the user to disapprove performance of the action;
responsive to failing to detect actuation of the user interface element within a length of time after presenting the action to the user, automatically perform the action on the remote computing system over the network to resolve the previous event at the remote computing system without first obtaining approval from the user; and
responsive to detecting actuation of the user interface element within the length of time after presenting the action to the user, remove presentation of the action, including the user interface element, and not performing the action on the remote computing system.

18. The method of claim 11, wherein in response to the notification of the occurrence of the previous event and performance of the user initiated action comprises:
receiving, by the computing device, the notification that the previous event has occurred at the remote computing system;
determining, by the computing device, an action to resolve the event at the remote computing system;
presenting, by the computing device, the action to the user of the computing device, including a user interface element actuatable by the user to select the action; and
responsive to detecting actuation of the user interface element by the user, performing, by the computing device, the action on the remote computing system over the network to resolve the event at the remote computing system.

19. A computing device comprising:
network hardware to communicatively connect to a network to which a remote computing system is communicatively connected;
display hardware;
input hardware;
a processor;
a memory storing computer-executable code executable by the processor to:
receive from the remote computing system a notification that an event has occurred at the remote computing system;
determine an action to resolve the event at the remote computing system;
present the action to a user of the computing device via the display hardware, including a user interface element actuatable by the user to disapprove performance of the action;
responsive to failing to detect actuation of the user interface element within a length of time after presenting the action to the user, automatically perform the action on the remote computing system over the network to resolve the event at the remote computing system without first obtaining approval from the user; and
responsive to detecting actuation of the user interface element via the input hardware within the length of time after presenting the action to the user, remove presentation of the action via the display hardware, including the user interface element, and not performing the action on the remote computing system.

20. The computing device of claim 19, wherein the computer-executable code is executable by the processor to further, after removing the presentation of the action via the display hardware and not performing the action on the remote computing system:

receive from the remote computing system a notification that the event has again occurred at the remote computing system;

present the action to the user of the computing device via the display hardware, including a user interface element actuatable by the user to select the action; and responsive to detecting actuation of the user interface element by the user via the input hardware, perform the action on the remote computing system over the network to resolve the event at the remote computing system.

21. The computing device of claim 19, wherein the computer-executable code is executable by the processor to further, after automatically performing the action on remote computing system:

receive from the remote computing system a notification that the event has again occurred at the remote computing system;

automatically performing, by the computing device, the action on the remote computing system over the network to resolve the event at the remote computing system without first obtaining approval from the user;

presenting, by the computing device, the action to the user of the computing device, including a user interface element actuatable by the user to roll back performance of the action; and responsive to detecting actuation of the user interface element, performing, by the computing device, an undo action on the remote computing system over the network to roll back the performance of the action.

22. The computing device of claim 19, wherein the processor is configured to determine the action to resolve the event at the remote computing system by determining, as the action, a most previously invoked action by the user responsive to prior occurrences of the event at the remote computing system.

23. The computing device of claim 19, wherein the computing device executing computer-executable code to perform a user initiated an action to resolve the previous event at the remote computing system further comprises the computing device executing computer-executable code to:

receive, by the computing device, the notification that the previous event has occurred at the remote computing system;

determine, by the computing device, an action to resolve the previous event at the remote computing system;

present, by the computing device, the action to the user of the computing device, including a user interface element actuatable by the user to select the action; and responsive to detecting actuation of the user interface element by the user, perform, by the computing device, the action on the remote computing system over the network to resolve the previous event at the remote computing system.

\* \* \* \* \*